March 1, 1966     C. G. F. HONIGH     3,237,417
METHOD OF CONDENSING AND PURIFYING LIQUID CHLORINE
Filed July 19, 1962
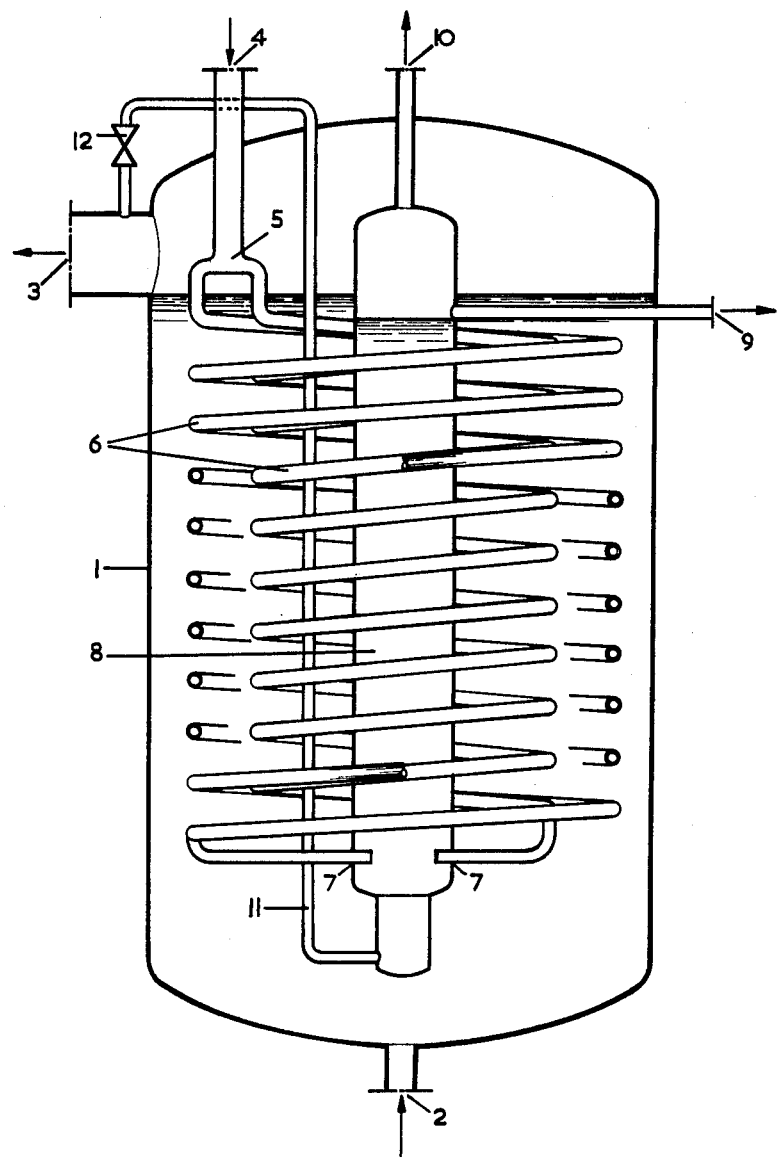
INVENTOR.
CHRISTIAAN GERARD FREDERIK HONIGH
BY Warburton & Cross 3,237,417
METHOD OF CONDENSING AND PURIFYING LIQUID CHLORINE
Christiaan Gerard Frederik Honigh, Delden, Netherlands, assignor, by mesne assignments, to Diamond Alkali Company, Cleveland, Ohio, a corporation of Delaware
Filed July 19, 1962, Ser. No. 211,057
Claims priority, application Netherlands, July 26, 1961, 267,560
4 Claims. (Cl. 62—11)

In the preparation of liquid chlorine by condensation of impure chlorine gas, often complications occur, accounted for by the nature of the impurities present in the chlorine gas. If the chlorine gas contains hydrogen, as is the case with chlorine obtained in the electrolysis of a common salt solution in mercury cells, the partial hydrogen pressure in the residual gas of the condensation may rise to such an extent, according as a greater fraction of the chlorine has been condensed, that the gas mixture becomes explosive. The chlorine gas may also contain impurities having a higher boiling point than the chlorine, which may cause the walls of the condensers to get fouled.

The condensation is often carried out in two or more steps, the difficulties presented themselves especially in the last step or steps. As a rule, normal surface condensers are used in this process. According to a known method, vide, e.g., Ind. Eng. Chem. 45 (1953) 1832 an extraneous, noncondensing gas is added after the first step, in order to prevent the formation of an explosive mixture.

Such a dilution of the gas is avoided in the method according to German "Auslegeschrift" 1,056,155, in which in total more than 99.5% of the ddead chlorine is condensed, and in which the condenser, in those stages in which the gas may be explosive, so constructed that the chlorine is condensed, distributed over very small spaces. This may, e.g., be effected by distributing the chlorine over a bundle of very narrow tubes. In this method, however, it is desirable to apply kick-back guards between the stages, and to have all parts of the installation electrically earth-connected. Moreover, the chlorine should first be purified very carefully according to special methods, in order to avoid deposition of impurities on the walls of the very narrow tubes, as this could obstruct the passage and decrease the transfer of heat.

The invention relates to an apparatus for the manufacture of liquid chlorine from chlorine-containing gas, characterized in that the apparatus comprises one or a plurality of downwardly inclined outwardly cooled tubes for the condensation of chlorine gas, which tubes open into the lower portion of a wider body forming a separation chamber for the separation of liquid chlorine and accompanying gases, which chamber in the upper part has a point for drawing off liquid chlorine, and an outlet for the remaining gas.

By the apparatus according to the invention the risk of explosion is reduced to a minimum, while the construction is simpler than that of the apparatuses known for this purpose. Specially constructed kick-back guards are unnecessary, while also a particularly careful purification of the chlorine gas may be omitted.

In the apparatus the gas to be condensed is passed in downward direction through the downwardly inclined tube or tubes, from which it enters the separation chamber, which, preferably, like the tubes, is outwardly cooled, in the same bath as the tubes, if so desired. However, this latter form of cooling is not essential; the separation chamber may also be provided with a good insulation.

As the point where the liquid chlorine is drawn off is arranged in the upper part of the separation chamber, the greater part of the chamber remains filled with liquid chlorine during operation. Now, if in the upper portion of the chamber, in which gas is present, an explosion would occur, the explosion cannot flash back to the gas in the tubes in which the condensation takes place. As such an explosion, if at all occurring, is not dangerous so long as the volume of gas is small, the point of withdrawal of the liquid chlorine from the chamber is preferably so chosen that the volume of the chamber above this point is no more than $\frac{1}{3}$ and preferably less than $\frac{1}{5}$ of the total volume of the chamber.

The number and the diameter of the tubes in which the condensation is effected, are so chosen that the velocity of the chlorine therein is rather high, so that an ignition, if any, cannot propagate against the direction of flow, and is extinguished. Moreover, the high velocity results in the walls of the tubes being kept clean, while also a good transfer of heat is ensured, so that the cooling surface area may be relatively small. Suitable velocities are e.e., over $\frac{1}{2}$ kg. of chlorine per $cm.^2$ of the cross-sectional area of the tube per minute, preferably over 1 kg. The extinguishing effect of the velocity is further supported by the presence of liquid chlorine, which is capable of absorbing much heat. The remaining gas bubbles upwards through the liquid chlorine in the separation chamber, during which ignitions, or explosions are entirely excluded.

In order to obtain a compact construction the tubes may be spirally arranged around the chamber; the whole may be arranged in a bath of boiling coolant. If so desired, the coolant may consist of chlorine of a lower pressure than within the tubes, in which case according to the non-prepublished Dutch patent application 265,000 a greater amount of chlorine is added to the cooling apparatus than is evaporated therein. The use of chlorine as a coolant offers the additional advantage that the separation chamber, if so required, can be drained in a simple manner by way of a conduit extending from the lower side of the body to the space outside the chamber.

In the drawing there is shown an embodiment of the apparatus according to the invention.

At 2 in vessel 1 a liquid coolant is supplied, e.g., chlorine, which boils in vessel 1. The vapor (or a liquid-vapor mixture) is discharged at 3. Compressed, crude chlorine gas is supplied at 4, and at 5 distributed through coils 6, in which the condensation occurs and which open into separation chamber 8 at 7. Liquid chlorine is drawn off from separation chamber 8 at 9; the remaining gas escapes at 10. In case chlorine is used as a coolant, separation chamber 8 can be drained by way of conduit 11 by opening valve 12.

What is claimed is:
1. A method of condensing chlorine from a gaseous mixture containing chlorine and hydrogen as an impurity and capable of forming explosive mixtures with chlorine, the improvement which comprises passing a stream of said gaseous mixture into a downwardly inclined elongated condensing zone at a rate such that at least $\frac{1}{2}$ kg. of chlorine per minute passes through per $cm.^2$ of the combined cross sectional area of said condensing zone, said zone being externally cooled to a temperature and at a pressure such as to promote condensation of gaseous chlorine contained in said stream, introducing the condensate and the remaining gas formed in said zone into a separating zone containing a body of liquid chlorine in fluid communication with the lower end of said condensing zone, maintaining the surface of said body of liquid chlorine in said separating zone at a level below the upper end of said separating zone, and maintaining the volume of said gas containing said hydrogen impurity in said separating zone at most $\frac{1}{3}$ of the total volume of the zone.

2. The method according to claim 1 characterized in that the volume of the gas above the point of withdrawal of the liquid chlorine is preferably less than ⅕ of the total volume of the condensing zone.

3. The method according to claim 1 characterized in that at least 1 kg. of chlorine per minute passes through per cm.$^2$ of the combined cross sectional area of said condensing zone.

4. The method according to claim 1 characterized in that the total of said condensing zone and said separating zone are cooled by boiling chlorine.

References Cited by the Examiner

UNITED STATES PATENTS

| | | | |
|---|---|---|---|
| 1,152,044 | 8/1915 | Place | 62—23 XR |
| 1,961,203 | 6/1934 | De Baufre. | |
| 1,962,176 | 6/1934 | De Baufre. | |
| 2,082,189 | 6/1937 | Twomey. | |
| 2,151,299 | 3/1939 | Miller | 62—11 |
| 2,984,078 | 5/1961 | Schmidt | 62—9 |
| 2,997,854 | 8/1961 | Schilling | 62—42 |

NORMAN YUDKOFF, *Primary Examiner.*